March 19, 1968 R. E. AYRES 3,374,304
METHOD FOR INJECTION MOLDING
Filed Aug. 20, 1965 4 Sheets-Sheet 1

RICHARD E. AYRES
INVENTOR
Huebner & Worrel
ATTORNEYS

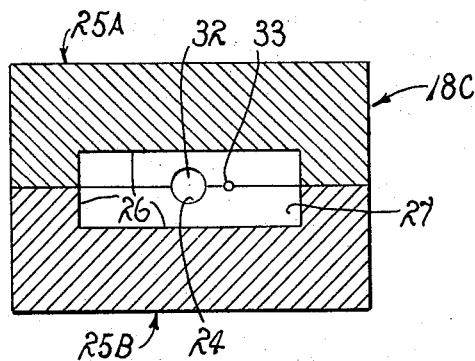
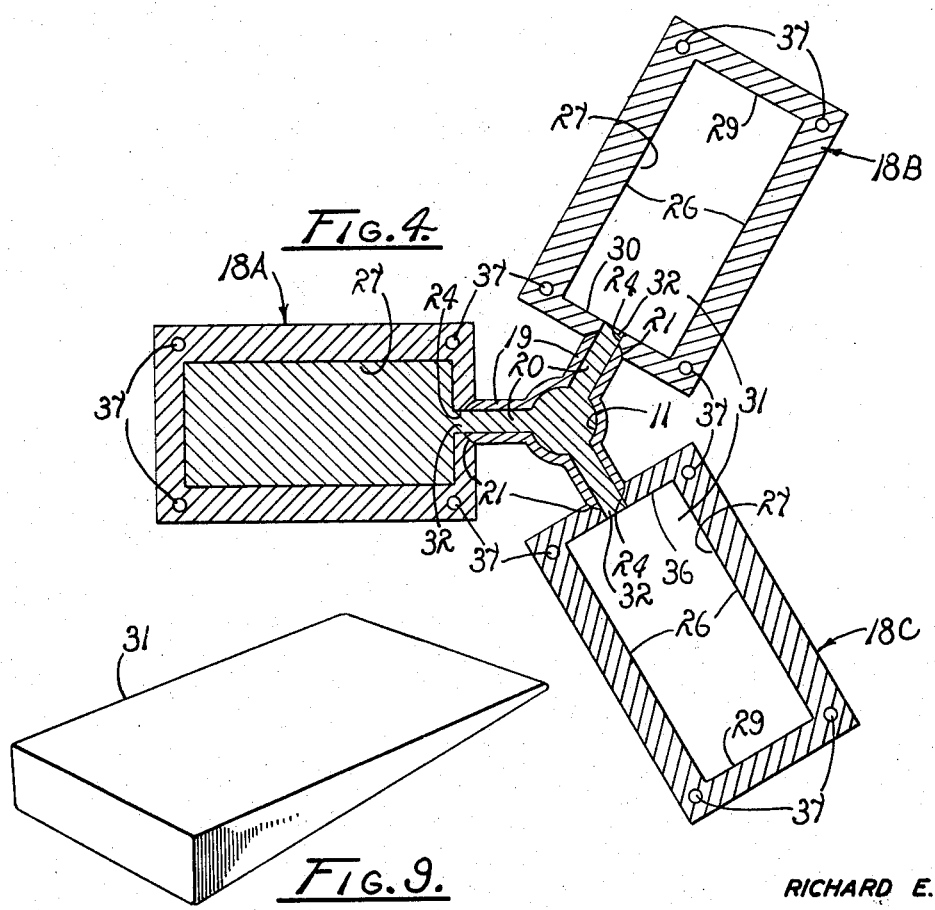
RICHARD E. AYRES
INVENTOR

March 19, 1968  R. E. AYRES  3,374,304
METHOD FOR INJECTION MOLDING
Filed Aug. 20, 1965  4 Sheets-Sheet 3

RICHARD E. AYRES
INVENTOR

Huebner & Worrel
ATTORNEYS

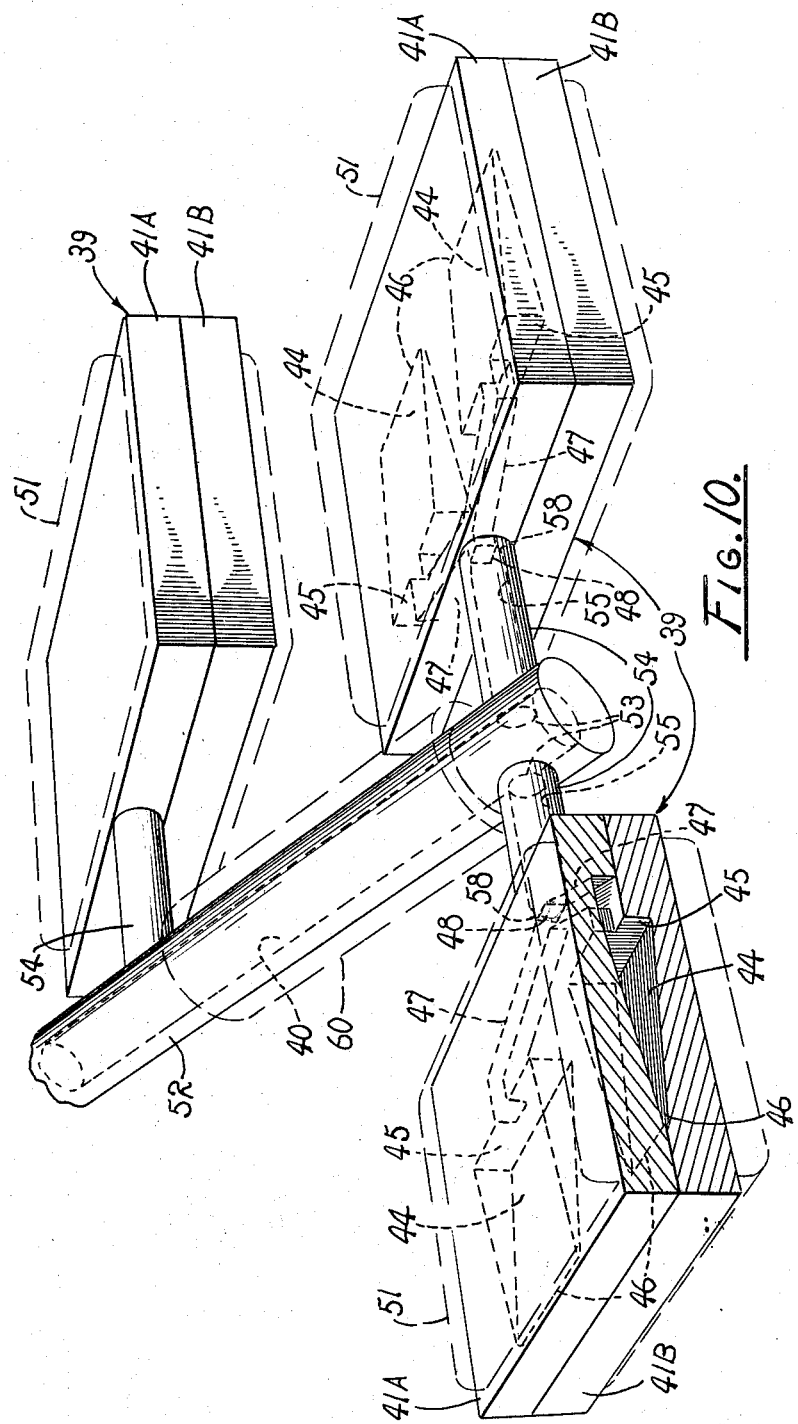

3,374,304
METHOD FOR INJECTION MOLDING
Richard E. Ayres, Rte. 1, Box 326,
Woodlake, Calif. 93286
Filed Aug. 20, 1965, Ser. No. 481,210
2 Claims. (Cl. 264—231)

The present invention relates to a method for injection molding, and more particularly to a method and apparatus for molding in a predetermined size and shape substantially unaffected by shrinkage a thermoplastic material characteristically prone to shrinkage when cooled from a molten state.

Previous to this invention, certain plastic materials have not been considered suitable for molding articles in a predetermined size and shape, since such materials are of a type which tends to shrink when cooled from a molten state. Although shrinkage of such materials during molding may be prevented to some extent by subjecting the material to extremely high pressure while in the mold, the extent of equipment necessary and the cost of its operation at such high pressures is practically prohibitive. Furthermore, completed articles molded under such tremendous pressures tend to be brittle and, therefore, are not well adapted to withstand high compressive stresses or shock, especially at low temperatures.

In the molding of certain types of articles such as wedges used in the lumbering industry, plastic materials have been used which do not tend to shrink during cooling and which are relatively easy to cast. However, wedges molded from such non-shrinking material have proven to be brittle under normal conditions of usage and tend easily to shatter at the cold temperatures typical of many climates during the seasons in which the trees are cut. A well-known example of such a brittle material is acrylate butadiene styrene, now in common usage in the manufacture of lumbering wedges.

An example of a thermoplastic material which tends to shrink upon cooling from a molten state and which, for this reason, has previously been considered by the plastics industry as not practical for injection molding at high temperatures is polyethylene. Such a material also tends to stick to the walls of a heating cylinder and thereby to decrease the efficiency of the plastizing process. Although raising the temperature of the molten material would appear to present a solution to this problem, it has previously been considered impossible to do so without causing the material to char and to experience undesirable cross-linking. However, polyethylene, when properly processed, possesses the desirable characteristics of being able to withstand high compressive stresses, shock and cold temperatures without shattering or displaying brittleness.

Therefore, it is an object of the present invention to provide a method of molding in a predetermined size and shape substantially unaffected by shrinkage a thermoplastic material characteristically prone to shrinkage when cooled from a molten state.

Another object is to provide such a method which utilizes polyethylene as the molding material and avoids charring or cross-linking of said material.

Another object is to provide such a method which eliminates the need for subjecting the material during molding to pressure high enough to cause brittleness in completed molded articles.

Another object is to provide such a method which avoids the use of plastic materials which tend to become brittle after having been cooled from a molten state.

Another object is to provide such a method for molding wedges for the lumbering industry which are adapted to withstand high compressive stresses at low temperatures without shattering.

Another object is to provide such a method adapted to produce completed articles in the form of wedges having a predetermined shape and size.

These, together with other objects and advantages, will become more fully apparent upon further reference to the following description in the specification and the accompanying drawings.

In the drawings:

FIG. 3 is a transverse vertical section of a mold housing of the apparatus of FIG. 1, taken in a plane represented by line 3—3 therein.

FIG. 4 is a horizontal section of the apparatus of FIG. 1 taken in a plane represented by line 4—4 therein and showing the disposition of molten material after the first injection step of a method based on the principles of the present invention.

FIG. 9 is an enlarged perspective view of a completed wedge formed by utilizing the method of the present invention.

FIG. 10 is a fragmentary schematic perspective view of a second form of apparatus embodying the principles of the present invention.

*First form of apparatus*

Figure 1:
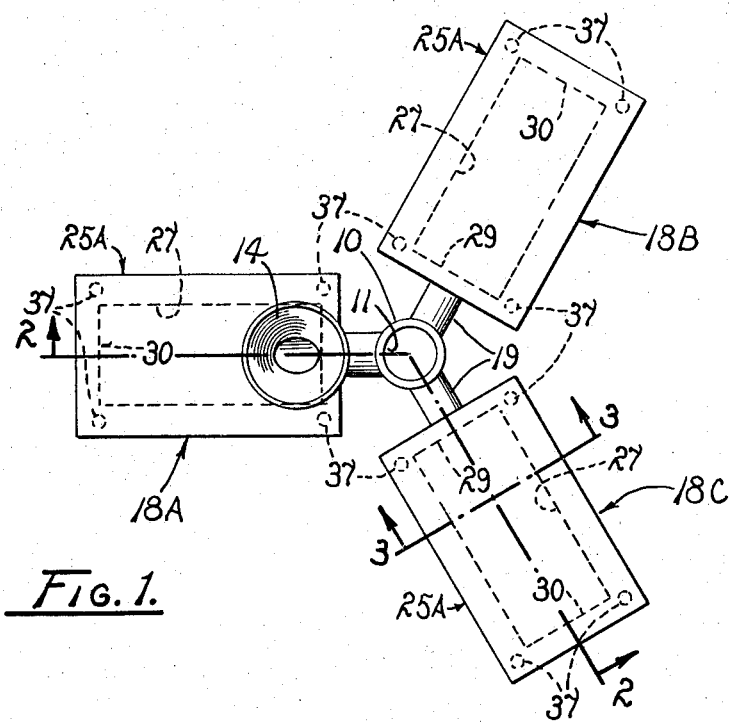
FIG. 1 is a plan view of an apparatus embodying the principles of the present invention.
Figure 2:
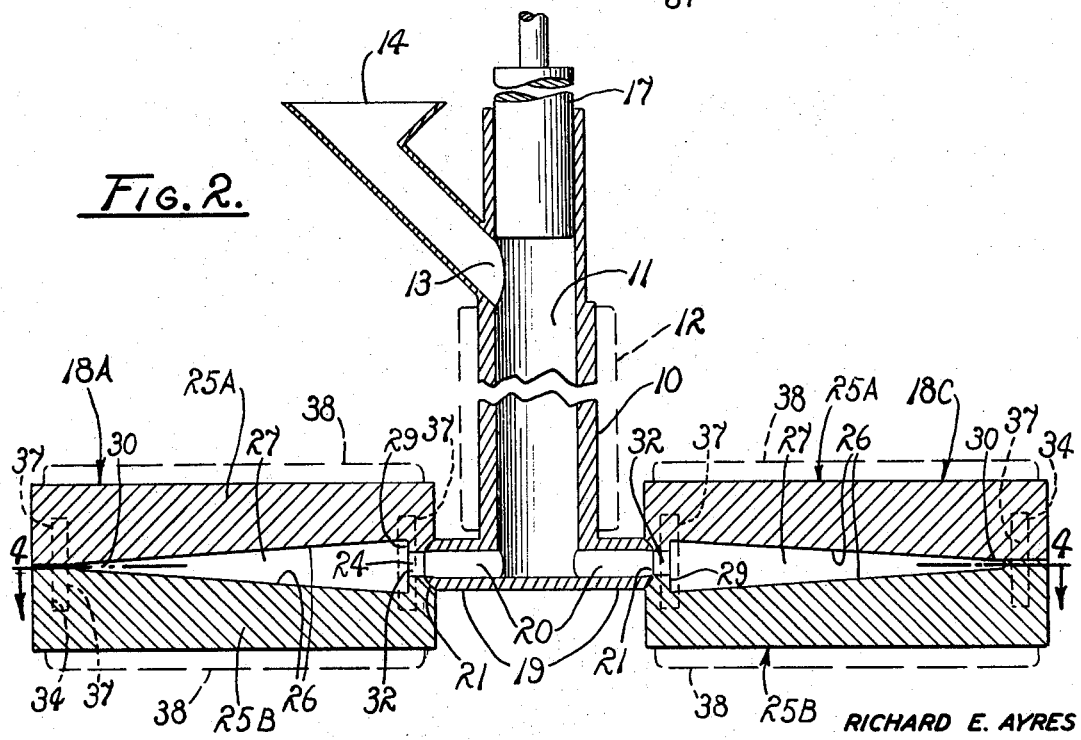
FIG. 2 is a vertical section of the apparatus of FIG. 1 taken in a segmented plane represented by line 2—2 therein.

An apparatus embodying the principles of the method of the present invention is shown generally in FIG. 2 and includes an elongated duct or cylinder 10 providing a passageway or heating chamber 11. The passageway is preferably of a right-circular cylindrical shape. A suitable heating element, such as an electrically energizable heating coil, shown schematically at 12, is disposed about the duct for heating the molding material contained therein, not shown, and maintaining it in a molten state. Suitable temperature control elements, also not shown, but well known in the art, are preferably provided along the passageway so as to sense the temperature of the material contained therein and to control the heating element as necessary to maintain the desired temperature. An opening 13 is provided in the duct and a suitable feed hopper 14 is connected thereto to allow convenient deposit of feed in any suitable form such as preformed pellets. A ram 17 is disposed within the duct at the upper end thereof for sliding reciprocative movement. The ram is actuated by any suitable type of pressure generating device adapted to impart sufficient pressure for effective injection molding. A five (5) H.P. motor and hydraulic pump, not shown, capable of generating pressures on the molten material approximating 12,000 to 13,000 pounds per square inch have been found suitable for this purpose. It will be appreciated by those skilled in the art of molding plastics that heating cylinder passageways may be adapted in various ways to ensure efficient heating of the plastic, uniform circulation of the plastic as required, and screening of undesirable objects or plastic formations from the molten material. Such details will not be described herein, since they form no part of the present invention.

Three mold housings 18A, 18B and 18C, respectively, are connected to the duct 10 at the bottom end thereof.

Preferably, the number of mold housings is at least equal to the number of injection steps utilized in the present invention, as will be described. Auxiliary ducts 19 project from the main duct so as to provide continuous fluid communication between each mold housing and the heating chamber 11 through auxiliary passageways 20. Each auxiliary duct terminates in a substantially round nozzle 21 having an inner diameter of approximately three-quarters of an inch and adapted to be seated in firm engagement with a sprue 24 provided in each assembled mold housing.

Each mold housings consists of a pair of mold platens 25A and 25B providing walls 26 and formed preferably of a type of material, such as hot-rolled iron, adapted to the ready release of molded material. In the present apparatus, the walls of each pair of mold platens when assembled surround a substantially wedge-shaped mold cavity 27 disposed between the platens and having a predetermined size or volume. The cavity in each housing has an enlarged end 29 disposed toward the heating chamber and a smaller or attenuated end 30 disposed away therefrom. The cavity is adapted to be blocked off from the duct by any suitable means, such as a valve, not shown, mounted in the auxiliary duct, or a stop wedge 31 disposable in the cavity.

The sprue 24 of each housing 18 provides a substantially round inlet passageway 32 communicating between the auxiliary duct passageway 20 and the cavity 27. A small aperture 33 may be provided adjacently of each inlet passageway to allow venting of the cavity during the injection of molten material. In the described embodiments, it is possible to obtain venting by allowing air to escape between the mutually engaged surfaces of the respective platens 25, which need only be tight enough to prevent flashing of molten material contained therewithin.

Holes 34 are preferably provided in the inner portions of the respective platens 25 for accommodating guide rods or dowels 37 as necessary to assure continuous registry between the two platens during opening and closing of the corresponding housings 18. The platens of each mold housing are held together by any suitable type of clamping unit, not shown, examples of which are well known in the industry. Such a unit may be adapted to reciprocate the platens toward and away from each other selectively to allow closing and opening of the mold cavities 27 for removal of molded articles therefrom. The mold housings are supported in any suitable manner such as by attachment to a clamping unit, also not shown. Suitable cooling elements, shown schematically at 38, are disposed across the upper and lower surfaces of each housing and are adapted to accommodate cooling water or other fluid in continuous flowing engagement with the respective mold platens.

Second form of apparatus

A second form of apparatus adapted to be used in the method of the present invention is shown schematically in FIG. 10. Its general structure is such that it may be mounted or supported in a leaning position and installed in an area having elevational space limitations. The basic elements of the second form are substantially similar to those of the first form except that the mold housings 39 are each of the multi-cavity type, rather than single-cavity, and the respective mold housings are disposed individually in communication with an elongated substantially cylindrical heating chamber 40 at selected locations along its longitudinal extent.

Each mold housing 39 consists of a pair of platens 41A and 41B formed preferably of hot-rolled iron, although any other suitable material adapted to the ready release of molded material is acceptable. The platens each provide at least a pair of mold cavities 44 therebetween when assembled. The cavities may be shaped in any form in which it is desired to produce molded articles. However, as with the first form, the cavities are shaped in the form of a wedge having an enlarged end 45 disposed toward the heating chamber 40 and an attenuated end 46 disposed away therefrom. The upper platen 41A provides runner channels 47 of substantially square cross-section adapted to communicate between the respective cavities and a sprue 48 also having a substantially square cross-section. A clamping unit of a suitable type, not shown, supports, open and closes each mold housing and maintains it in a closed position under suitable clamping pressure. Cooling elements, shown schematically at 51, are disposed in contact with the platens and are adapted to function in a manner similar to the cooling elements 38 of the first form.

The heating chamber 40 extends through an elongated duct 52 having apertures 53 in which are disposed auxiliary ducts 54 with passageways 55. The auxiliary ducts each terminate in a nozzle 58 of substantially square cross-section and adapted to be snugly fitted into the sprue 48 of a mold housing 39. Each sprue also has a square cross-section. The respective internal widths of the nozzles and sprues are each preferably about three-quarters on an inch. A heating element, shown schematically at 60, surrounds the duct 52 in snug engagement therewith and consists preferably of an electrically energizable coil, not shown, as in the first form. Also as in the first form, any suitable type of feed hopper is connected to the upper end of the duct and a ram provided in the passageway for forcing molten material through the heating chamber. The ram is activated by a suitable power unit, also not shown, and is adapted to transmit pressures of approximately 12,000 to 13,000 pounds per square inch.

Method

Practice of the present invention is substantially similar utilizing either of the forms of apparatus described. However, for convenience, the following description first relates to the practice of the present invention with the first form. Although it is possible to utilize only one mold housing 18 in performing the method of the present invention, its advantages are more fully realized and greater economy and efficiency are achieved when at least three molds are used.

In preparation for the practice of the method of the present invention, the mold cavities 27 in two of the three mold housings to be utilized, for instance, housings 18B and 18C, are each closed by means of a previously formed stop wedge, such as that shown at 31, inserted therein. All three of the mold housings are assembled and their respective platens 25 are clamped securely together.

Initially, the ram 17 is disposed in a retracted or cocked position preparatory to pressurized movement into the heating cylinder or chamber 11. The heating element 12 surrounding the cylinder is energized and the cylinder is filled with a quantity of plastic material, preferably pelleted polyethylene, by insertion of the material in the feed hopper 14 for gravitational descent into the heating cylinder. The heating element raises the temperature of the polyethylene until it reaches the desired molten state, preferably at a temperature of approximately 550° F. Temperature indication is provided preferably by thermostatic control elements, not shown, associated with the heating element. As the polyethylene reaches the desired molten state, it assumes a degree of fluidity sufficient to allow injection of the material into the respective cavities 27 without tendency towards obtrusive drooling or creeping into the cavities under its own gravitational impetus. When the plastic reaches the desired molten state, the cooling elements 38 are activated.

Figure 5:
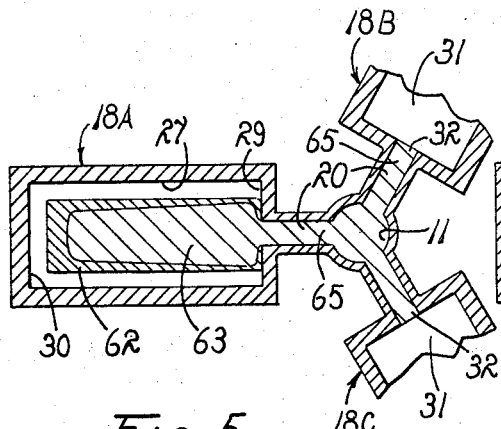
FIG. 5 is a fragmentary horizontal section similar to that of FIG. 4 and showing the disposition of the injected material prior to the second injection step.

The next step consists of activating the ram 17 to inject a quantity of the molten material into the open cavity 27 of mold housing 18A. The ram imposes a pressure on the material in the heating cylinder 10 of approximately 12,600 pounds per square inch, sufficient to force the material into the cavity, filling the cavity to the walls 26 thereof, as shown in FIG. 4. The ram is then retracted temporarily to remove the pressure on the molten material. The upper platen 25A of mold housing 18B, which is next to be filled, is then displaced upwardly to allow removal of a stop wedge similar to wedge 31, after which mold housing 18B is again closed. At the same time, the injected material in the cavity of mold housing 18A commences to cool and to form a gradually hardening outer layer 62 which tends to shrink away from the walls of the cavity while leaving an inner molten core 63 of gradually diminishing volume, as shown in FIG. 5.

Figure 6:
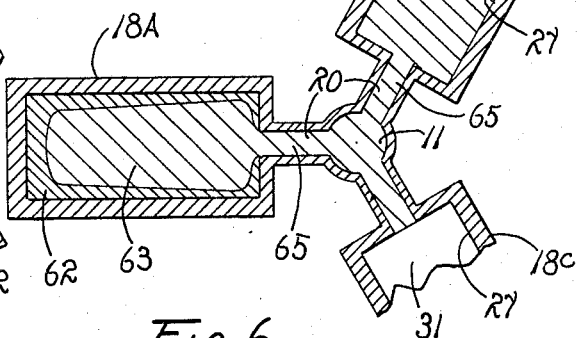
FIG. 6 is a fragmentary horizontal section similar to that of FIG. 4 and showing the second injection step.

The ram 17 is then actuated again to inject a quantity of material into mold housing 18B so as to fill the cavity 27 completely to the walls 26 thereof and at the same time to inject additional molten material into the cavity of mold housing 18A, as shown in FIG. 6. The additional material is forced into the core 63 of the cooling wedge form at a pressure sufficient to stretch the hardening outer layer 62 and to expand it to the walls of the cavity. The ram is then retracted to remove pressure from the molten material. The top platen 25A of mold housing 18C is then removed so as to allow removal of the stop wedge similar to wedge 31.

Figure 7:
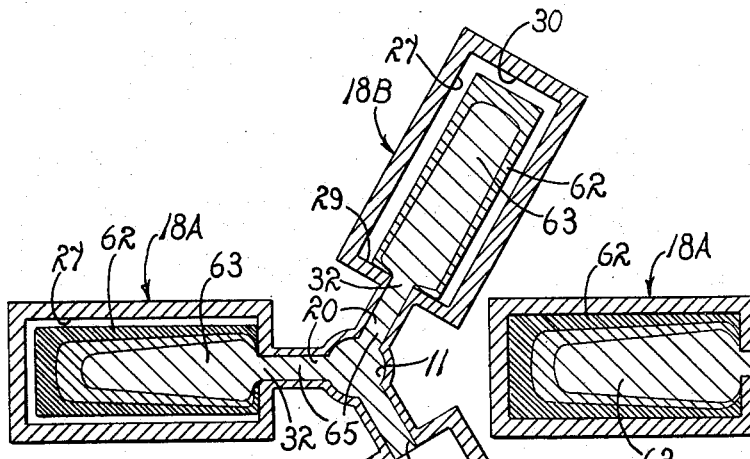
FIG. 7 is a horizontal section similar to that of FIG. 4 showing the disposition of the molten material prior to the third injection step.

As in the preceding step, the wedge form in each of the mold housings 18A and 18B undergoes cooling and forms or continues to form an outer hardening layer 62 which tends to shrink away from the walls 26 of the corresponding cavity 27, as shown in FIG. 7. The outer layers each surround an inner molten core 63 which communicates with the molten material in the heating cylinder 10 through a continuous molten stream 65 disposed through the auxiliary passageway 20, the nozzle 21 and the sprue 24.

Figure 8:
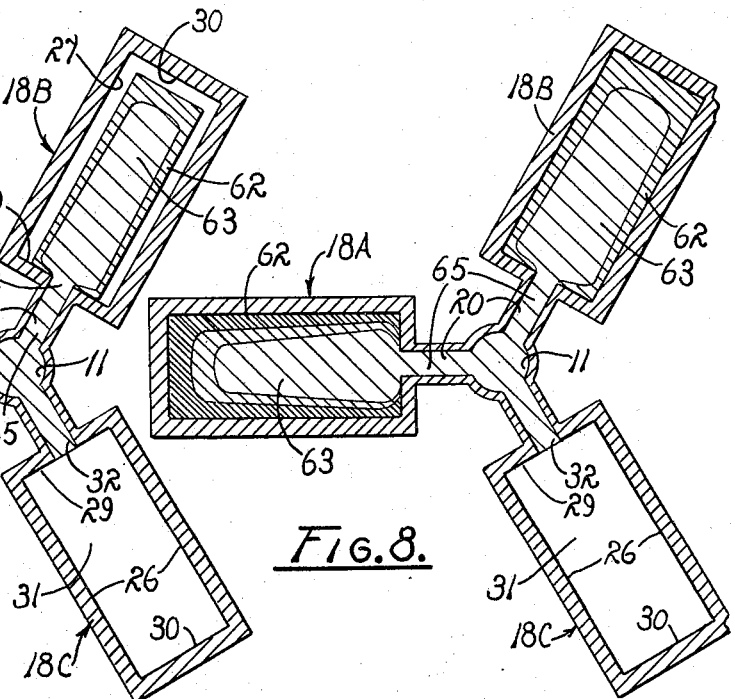
FIG. 8 is a horizontal section similar to that of FIG. 4 showing the third injection step.

The next step consists of reactivating the ram 17 to pressurize the molten material in the heating cylinder 10 and to inject it into all three mold housings 18, as shown in FIG. 8. A quantity of material is forced into the cavity 27 of housing 18C so as to fill it completely to the walls 26 thereof. An additional quantity is forced into the molten core 63 in housing 18B so as to expand the hardening layer 62 against the walls of the cavity. A further quantity of material is forced into the diminishing molten core in the cavity of housing 18A so as to stretch the growing hardening layer and to expand it to the walls of the cavity in substantial conformity with the shape of the wall and size of the cavity. The cooling elements 38 continue to operate and to cool the wedge forms in the respective cavities.

At this point, the wedge form in mold housing 18A still has a molten inner core 63 but its hardened outer layer 62 has increased to such an extent that the shape and size of the wedge form has reached a state of substantial conformance with the walls 26 of the cavity 27. Obviously the hardened outer layers are tensioned in pre-stressed condition. Although additional steps may be performed to inject further quantities of material into the molten core of housing 18A, it has been found that the two additional injections described above is sufficient to achieve a wedge form having a high degree of conformity to the size and shape desired. Therefore, at this point, the upper platen 25A of mold housing 18A is separated from the lower platen 25B to expose the wedge form and to allow its removal. The wedge is removed in any suitable manner, such as by means of a crowbar, not shown. The wedge is then deposited in a container of suitable cooling fluid, not shown, where it reaches completion in a cooled and hardened state.

Immediately after removal of the molded wedge, the top platen 25A of housing 18A is again secured to the lower platen 25B and the cavity 27 is then ready to accommodate an additional quantity of molten material for repetition of the preceding steps. The viscosity of the molten material is such that any drool from the exposed nozzle 21 is minimal and, if the removal of the completed wedge is accomplished in an expeditious manner, the mold housing 18A may again be assembled without hindrance by obtruding material. Although thermostatic control of the heating element is sufficient to maintain injected material at the desired temperature, it is possible to supplement the heating process by means of acetylene torches or the like, not shown, so as to avoid any possible cooling or tunneling of the molten material as it proceeds into the nozzles.

The next step consist of actuating the ram 17 to inject a quantity of molten material into the cavity 27 of mold housing 18A so as to cause the initial formation of an additional wedge form. At the same time, further quantities are injected into the respective molten cores 63 of the housings 18B and 18C. As a result, the wedge form in housing 18B is brought to a desired degree of conformity with the walls 26 thereof and is therefore removed in a manner similar to that described above for the first wedge form completed.

The preceding steps may be repeated as often as desired. The supply of fresh material to the heating cylinder 10 is preferably accomplished periodically in order to maintain a full passageway and to allow effective operation of the ram 17 during injection.

After completion of a sufficient number of cycles to obtain the desired number of wedges, the apparatus is shut down by de-energizing the heating element 12 and allowing the material within the heating cylinder 10 to cool. At the same time, the material remaining in the respective cavities 27 is allowed to cool, which may be conveniently accelerated by continued operation of the cooling elements 38.

The apparatus is left in a cooled inoperative condition until it is desired to manufacture the next batch of wedges. At such time, the hardened wedge forms and runners are removed from mold housing 18A to prepare it for receipt of molten material. The heating element 12 is energized and the hardened material contained within the passageway 11 is heated to a molten state. The material in the auxiliary ducts 19 is also heated, either by means of heating coils or an acetylene torch, not shown. The apparatus is then ready for commencement of the successive methodical steps described above.

In practising the method of the present invention utilizing the second form of apparatus, the above steps are followed in substantially the manner described for the first form of apparatus. Although there is some tendency for the material in the runner channels 47 to cool and form a hardening outer layer, not shown, this does not restrict the flow of the molten stream, due to the relatively large cross-sectional width of the inlet passageway and nozzle.

Although the runners 47 in each housing 39 are disposed above the surface of the lower platen 41B, the square cross-sectional configuration of the runners allows the ready separation of the upper platen therefrom. The location of the runners on top of the lower platen allows their ready removal along with the molded wedges. The wedges are then disconnected from the runners for deposit in a cooling container, not shown. The disconnected runners may be reused in subsequent stages of the molding process, as desired.

Location of a sprue 24 or runner 47 at the enlarged end of a cavity 27 or 44 allows maintaining the molten core 63 in continuous fluid communication with the supply of fresh molten material in the heating cylinder 10, so that injection of additional material into the core in accordance with the principles of the present invention remains possible throughout the process. The relatively large diameters of the nozzles, sprues and runners enhances this capability. In addition, injection of material into the enlarged portion tends to cause the entering material to circulate more freely than if injected at the attenuated end, thus increasing the uniformity of cooling. Another feature promoting uniformity of cooling is the variation in the thickness of cavity walls 26 in inverse relation to the thickness of the wedge form therewithin.

That is, at the enlarged end 29 of a wedge, the wall 26 is thinner and thus dispenses heat from the molten material in the cavity at a faster rate than at the attenuated end 30, where the wall is thicker.

In removing the molded articles or wedges from a mold housing 18, it has been found that use of hot-rolled iron for the mold housings avoids the problem of undesirable adhesion between the wedges and their respective housings. For this reason, it is unnecessary to utilize either conventional knockout devices or mold lubricants.

Due to the succesive stretching and expansion of the cooling and hardening wedges in their respective cavities, the finished wedge forms after they have been completely hardened have retained the desired degree of conformity with the size and shape of the articles. The polyethylene material, although heated to temperatures as high as 550° F., shows no evidence of charring or cross-linking. Completed wedges experience no brittleness at low temperatures and are capable of withstanding high compressive stresses and shock, such as those encountered in the lumbering industry.

From the foregoing, it is readily apparent that a method and apparatus has been provided for molding in a predetermined size and shape substantially unaffected by shrinkage a thermoplastic material characteristically prone to shrinkage when cooled from a molten state. The method allows the use of polyethylene as the thermoplastic material and avoids charring or cross-linking of said material. Articles molded by the method described are durable and without brittleness even at extremely low temperatures. In addition, an apparatus has been provided for practice of the method. The apparatus has a simple and durable structure adapted to economical operation.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. Method of injection molding articles of a selected size and shape to form a plurality of articles of substantially homogeneous thermoplastic materials characteristically prone to shrinkage when cooled from a molten state comprising heating a source of said material to a molten state; injecting under pressure a first quantity of molten material from said source into a first cavity of a plurality of mold cavities, each cavity being formed by a wall having substantially the internal shape and size of the desired end product to be formed and providing an inlet, said injected material filling said first cavity to the wall thereof; cooling the material in said first cavity so that it forms a progressively hardening outer layer and a diminishing molten inner core communicating with the inlet, said material shrinking from the wall during hardening; injecting under pressure a second quantity of molten material from said source distributively into the core in the first cavity and into a second cavity substantially simultaneously to fill said second cavity to the wall thereof and to expand the hardening layer in the first cavity to the wall thereof; cooling the material in said cavities respectively to increase the hardening layer in the first cavity and to form a progressively hardening outer layer and a diminishing molten inner core in the material of the second cavity, said core communicating with the inlet to said cavity, said material in the second cavity shrinking from the wall thereof during hardening; repeating the preceding steps until the material in the first cavity during cooling reaches a degree of substantial conformity with the internal shape of the wall and size of the cavity, each repetitive step including injection of similar molten material under pressure into an additional cavity substantially similar to the first and second cavities so that the total number of cavities utilized equals the number of injection steps necessary to bring the material in the first cavity to said degree of conformity; removing the substantially conforming material from the first cavity; and repeating the steps successively to complete said conformance of the material in the respective cavities and to remove the substantially conforming material in turn from said cavities, the cavities from which the material has been removed being utilized as the respective additional cavities for subsequent injection steps, the individual quantities of material removed from the respective cavities forming molded substantially homogeneous articles.

2. A method of injection molding articles of a selected size and shape to form a plurality of articles of substantially homogeneous thermoplastic materials characteristically prone to shrinkage when cooled from a molten state comprising heating a source of said material to a molten state; injecting under pressure a first quantity of molten material from said source into a first cavity of a plurality of mold cavities, each cavity being formed by a wall having substantially the internal shape and size of the desired end product to be formed and providing an inlet, said injected material filling said first cavity so that it forms a progressively hardening outer layer and a diminishing molten inner core communicating with the inlet, said material shrinking from the wall during hardening; injecting under pressure a second quantity of molten material from said source distributively into the core in the first cavity and into a second cavity substantially simultaneously to fill said second cavity to the wall thereof and to expand the hardening layer in the first cavity to the wall thereof; cooling the material in said cavities respectively to increase the hardening layer in the first cavity and to form a progressively hardening outer layer and a diminishing molten inner core in the material of the second cavity, said core communicating with the inlet to said cavity, said material in the second cavity shrinking from the wall thereof during hardening; continuing to deliver charges of molten material under pressure concurrently to the cavities in time spaced pulses; and removing the hardened substantially conforming material from successive cavities intermediate the delivery of said charges to the cavities, the first charge following the removal of said material from a cavity serving substantially to fill such cavity and each subsequent charge to a previously filled cavity serving to expand the hardened outer layer of material substantially to conform to the wall of the cavity whereby wedges of pre-stressed outer layers are produced.

References Cited

UNITED STATES PATENTS

| 2,686,935 | 8/1954 | Stott | 264—328 X |
| 2,696,023 | 12/1954 | Stott | 264—328 |
| 2,719,330 | 10/1955 | Stott. | |

FOREIGN PATENTS

| 1,330,644 | 5/1963 | France. |
| 15,474 | 9/1962 | Japan. |
| 356,143 | 10/1919 | Germany. |

ROBERT F. WHITE, *Primary Examiner.*

A. R. NOE, R. B. MOFFIH, *Assistant Examiners.*